United States Patent [19]

Alfano et al.

[11] Patent Number: 4,987,575

[45] Date of Patent: Jan. 22, 1991

[54] TETRAVALENT CHROMIUM ($CR_{4+}$) AS A LASER-ACTIVE ION FOR TUNABALE SOLID-STATE LASERS

[76] Inventors: Robert R. Alfano, 3777 Independence Ave., Bronx, N.Y. 10463; Vladimir Petricevic, 730 Fort Washington Ave., Apt. 4C, New York, N.Y. 10040

[21] Appl. No.: 450,462

[22] Filed: Dec. 14, 1989

Related U.S. Application Data

[63] Continuation-in-part of Ser. No. 248,749, Sep. 26, 1988, which is a continuation-in-part of Ser. No. 128,811, Dec. 4, 1987.

[51] Int. Cl.$^5$ ............................................. H01S 3/16
[52] U.S. Cl. ........................................ 372/41; 372/39; 252/301.17
[58] Field of Search ................ 372/39, 41; 252/301.17

[56] References Cited

U.S. PATENT DOCUMENTS

| | | | |
|---|---|---|---|
| 4,648,094 | 3/1987 | McCallum et al. | 372/41 |
| 4,679,198 | 7/1987 | Shone et al. | 372/41 |
| 4,797,889 | 1/1989 | Lempicki | 372/41 |
| 4,802,180 | 1/1989 | Brandle, Jr. et al. | 372/41 |
| 4,811,349 | 3/1989 | Payne et al. | 372/39 |
| 4,841,530 | 6/1989 | Chai et al. | 372/39 |

Primary Examiner—Leon Scott, Jr.
Attorney, Agent, or Firm—Irving M. Kriegsman

[57] ABSTRACT

A laser-medium in the form of a dielectric crystal or glass doped with tetravalent chromium. The dielectric crystals are of olivine-like structure such as germanates of formula (A) $(RE)GeO_4$ where (A = Na or Li, RE = Y, Lu or Gd), crystals of willemite structure $Zn_2$(Si or Ge)$O_4$ tetrahedral sites, or any other single-crystal or polycrystalline compound containing the (Si.Ge)$O_4$ tetrahedra in its crystal lattice, such as $Ca_3La_2(SiO_4)_6$ and crystals such as YAG ($Y_3Al_5O_{12}$).

2 Claims, 2 Drawing Sheets

TETRAVALENT CHROMIUM (CR4+) AS A LASER-ACTIVE ION FOR TUNABALE SOLID-STATE LASERS

CROSS-REFERENCE TO RELATED APPLICATIONS

This application is a continuation-in-part of U.S. patent application Ser. No. 248,749 filed on Sept. 26, 1988 in the names of Robert R. Alfano, Vladimer Petricevic and Swapen K. Gayen which is a continuation-in-part of U.S. patent application Ser. No. 128,811 filed on Dec. 4, 1987 in the names of Robert R. Alfano, Vladimir Petricevic and Swapan K. Gayen.

BACKGROUND OF THE INVENTION

The present invention relates generally to lasers and more particularly to laser materials.

The use of lasers in science and industry has received wide acceptance in an ever increasing variety of applications. Lasers have found use in such diverse areas as range finding apparatus, optical surgery, optical printers, optical readers and metal drilling. Lasers operate on the principle of light amplification through stimulated emission of radiation and can create extremely intense concentrations of light. Materials which have been used as laser media include gases, liquids, glasses and single crystalline solids.

When single crystalline solids are utilized in lasers, the crystals are generally in the form to elongated rods. The structure of the crystalline material must be very nearly perfect, since any optical inhomogeneities will cause distortion and scattering of the laser beam and thereby reduce the intensity and coherence of the radiation. Imperfections in the crystal which adversely affect lasing performance include elastic strain, crystal misorientations, chemical concentration inhomogeneities, dislocations, inclusions and bubbles.

In U.S. Pat. No. 3,997,853 to R.C. Morris et. al there is disclosed a laser in which the host comprises a single crystal of beryllium aluminate ($BeA_2O_4$) doped with trivalent chromium ions, the single crystal being crystallographically oriented substantially along the a-c plane, at least 30 degrees removed from the b-axis, and having a chromium doping concentration ranging from about 0.005 to 1.0 atom percent.

In U.S. Pat. No. 4,272,733 to J.C. Walling et al., there is disclosed a high power, broadly wavelength-tunable laser system which comprises as the laser medium particular single crystals of chromium-doped beryllium aluminate ($BeA_2O_4:Cr^{3+}$) having the chrysoberyl structure, means for exciting the laser medium and tuning means. The laser may be operated over a broad temperature range from cryogenic temperatures to elevated temperatures. Elevated temperatures are preferred, however, since they result in higher laser gain. Emission is in a spectral range from red to infrared, and the laser is useful in the fields of defense, communications, isotope separation, photochemistry, etc.

In U.S. Pat. No. 4,019,156 to W.D. Fountain there is disclosed a Q-switched/mode-locked Nd;YAG laser oscillator employing simultaneous active (electro-optic) and passive (saturable absorber) loss modulation within the optical cavity. This "dual modulation" oscillator can produce transform-limited pulses of duration ranging from about 30 psec to about 5 nsec with greatly improved stability compared to other mode locked systems. The pulses produced by this system lack intrapulse frequency or amplitude modulation, and hence are idealy suited for amplification to high energies and for other applications where well-defined pulses are required. Also, the pulse of this system have excellent interpulse characteristics, wherein the optical noise between the individual pulse of the pulse train has a power level well below the power of the peak pulse of the train.

In U.S. Pat. No. 4,464,761 to R.R. Alfano, et. al. a laser system in which the laser medium is a single crystal of $Be_3A_2(SiO_3)_6:Cr^3$ (Emerald) is disclosed. Because of its wide fluorescence bandwidth, the matrial is suitable for high intensity, tunable, mode-locked pulses with durations as short as 10–500 femtoseconds. A number of different laser systems containing this laser medium are described.

In an article entitled Color by Kurt Nassau appearing in Scientific American October 1980, Volume 243, Number 4, pp. 124–156, various properties of Ruby, Alexandrite and Emerald are discussed.

Other known references of interest are, Japanese Patent Documents JP-A-61-240692, (25-10-86) and JP-A-62-62573 (19-3-1987) and the following publications:

V. Petricevic, S.K. Gayen, R.R. Alfano, K. Yamagishi, H. Anzai, and Y. Yamaguchi, Appl. Phys. Lett. 52, 1040 (1988).

R.R. Alfano, V. Petricevic, and S.K. Gayen, U.S. Patent (pending).

V. Petricevic, S.K Gayen, and R.R. Alfano, Appl. Opt. 27,4162 (1988).

V. Petricevic, S.K. Gaven, and R.R. Alfano, Appl. Physc. Letters. 53, 2590 (1988).

F.A. Cotton, Chemical Applications of Group Theory, Wiley-Interscience, New York, (1971).

J.A. Caird, in Tunable Solid-State Lasers II, A.B. Budgor, L.E. Esterowitz, and L.G. DeShazer, editors, Springer-Verlag (1988).

S.E. Stokowski, M.H. Randles, and R.C. Morris, IEEE J. Quantum Electron. 24, 934 (1988).

SUMMARY OF THE INVENTION

It is an object of this invention to provide a new and improved laser material.

It is another object of this invention to provide a new and improved chromium doped laser material.

According to the teaching of the present invention there is provided a laser medium (i.e. material) which comprises a dielectric crystal doped with tetravalent chromium ions. The laser material may be made either in a rod type or a disc type configuration. The chromium doping is in the range of about 0.01 to 0.5 atom percent.

BRIEF DESCRIPTION OF THE DRAWINGS

In the drawings wherein like reference characters represent like parts.

DETAILED DESCRIPTION OF PREFERRED EMBODIMENTS

In copending application Ser. No 248,749 the use of $Cr^{4+}$ doped forsterite as a laser material is disclosed. The present invention is directed to the use of tetravalent chromium ($Cr^{4+}$) as laser-active ion in a dielectric crystal host for lasing in infrared spectral region.

In the past, the successful room temperature laser operation of chromium-doped forsterite ($Cr:Mg_2SiO_4$) was attributed to $Cr^{3+}$ ion substituting for $Mg^2$ in the octahedrally coordinated site with mirror symmetry ($C_s$). It nows appears that tetrahedrally coordinated $Cr^{4+}$ is really the lasing ion in chromium-doped forsterite in the near infrared spectral region.

When transition-metal ion (such as $Cr^{3+}$, $Ti^{3+}$, $V^{2+}$, etc.) is incorporated in a host crystal during the crystal-growning process its free-ion energy levels split due to the crystal field produced by surrounding (so-called ligand) ions. The effect of ligand ions around the impurity ion depends on the number of ligand ions around the impurity ion and the symmetry of the site occupied by the impurity ion. $Cr^{3+}$, the most common lasing ion, always occupies octahedral sites, surrounded by six ligand ions.

In tetrahedral coordination, the transition-metal cation such as $Cr^{4+}$ sits at the center of a tetrahedron surrounded by four anion ligands. Tetrahedral coodination produces lower crystal field splittings than octahedral coordination. For equal ligand ion charges and transition-metal impurity ion-ligand distances the ratio of the tetrahedral to octahedral crystal field strength is given by $$Dq(tet)/Dq(oct) = -4/9$$

Figure 1:
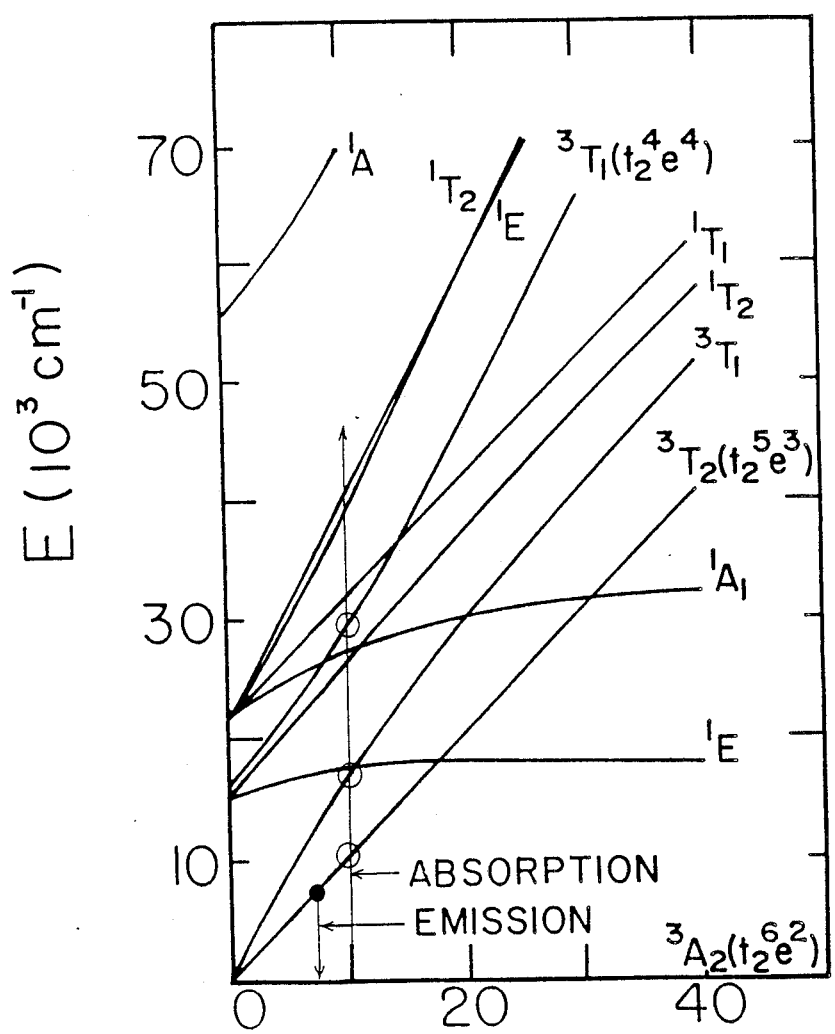
FIG. 1 is a chart useful in understanding the invention.

The most important consequence of this relation is that the absorption and the Stokes-shifted luminescence of ions residing in a tetrahedral environment is expected to shift significantly into the infrared spectral region. Consequently, tunable laser operation is expected to cover the range between 1-2 $\mu m$. This is best illustrated by the Tanabe-Sugano diagram shown in FIG. 1 for $3d^2$ ion such as $Cr^{4+}$ in tetrahedral coordination. Assuming the crystal field splitting 10Dq $\overline{10},000$ $cm^{-1}$ and Raccah parameter for $Cr^{4+}$ B $\overline{1},000$ $cm^{-1}$ it can be seen that the emission should occur in the 1-2 $\mu m$ spectral region. This is indeed the case for $Cr^{4+}$ in forsterite. Thus, $Cr^{4+}$ is transition-metal ion which, when incorporated in different dielectric crystal hosts, can exhibit laser action in different parts of infrared region due to different crystal fields acting on $Cr^{4+}$ ion.

A very important feature of $3d^2$ ions in tetrahedral sites, as seen from the Tanabe-Sugano diagram, is the existence of 3 spin-allowed absorption bands, indicated in the diagram, which is of great importance for efficient laser pumping, especially for flashlamp pumping.

Another important aspect of $Cr^{4+}$ substituting for tetravalent cation, such as $Si^{4+}$ is forsterite, is that tetrahedral site provides ideal environment for covalent bonding with surrounding ligand ions, such as divalent oxygen. High covalency of Cr(IV)—O(II bond in forsterite can account for high chemical stability against both the oxidation and reduction of the $Cr^{4+}$ ion.

Many known laser crystal hosts possess both octahedral and tetrahedral sites. Trivalent chromium ($Cr^{3+}$) shows strong preference for octahedrally coordinated sites. In at least one crystal (i.e., $Mg_2SiO_4$), having both octahedral and tetrahedral sites, some of the chromium ions of tetravalent state can be forced to substitute for $Si^{4+}$ in tetrahedral sites. This has been accomplished by growing the crystal in a more oxidizing atmosphere (with higher oxygen partial pressure). It is also known that in garnets the presence of divalent impurities such as $Ca^{2+}$ or $Mg^{2+}$ promotes formation of an optically active center tentatively identified as $Cr^{4+}$ in tetrahedral coordination. Therefore, it is possible, either by controlling the crystal-growing atmosphere, or by changing the starting materials for crystal-growing process, to incorporate tetravalent chromium ($Cr^{4+}$) into tetrahedral sites of the host crystal.

Thus, as can be seen, tetravalent chromium ($Cr^{4+}$) in tetrahedral coordination can be used as a laser-active ion for near infrared lalser operation in the spectral region between 1-3 $\mu m$. $Cr^{4+}$ has already successfully lased in forsterite in the 1167–1345 nm region.

By controlling the growing process $Cr^{4+}$ can be incorporated in tetrahedral sites in a variety of other materials. Host crystal candidates for $Cr^{4+}$ lasing ion are crystals of olivine-like structure such as germanates of formula (A) (RE)$GeO_4$ where (A=Na or Li, RE=Y, Lu or Gd), crystals of willemite structure $Zm_2SiO_4$ and its germanium analog $Zm_2GeO_4$ having two inequivalent tetrahedral sites, or any other single-crystal or polycrystalline compound containing the (Si or Ge)$O_4$ tetrahedra in its crystal lattice, such as $Ca_3La_2(SiO_4)_6$.

$Cr^{4+}$ in the above hosts form a class of tunable solid state lasers for 1–3 $\mu m$ wavelength region with unique properties. $Cr^{4+}$ in tetrahedral sites forming covalent bond with surrounding oxygen ions will be chemically stable. The above noted host materials are nontoxic, of good thermomechanical properties and are relatively easy to grow by Czochralski, hydrothermal or laser-heated pedestal growth method in an oxydizing atmoshphere such as 1% –50% oxygen partial pressure.

Figure 2:
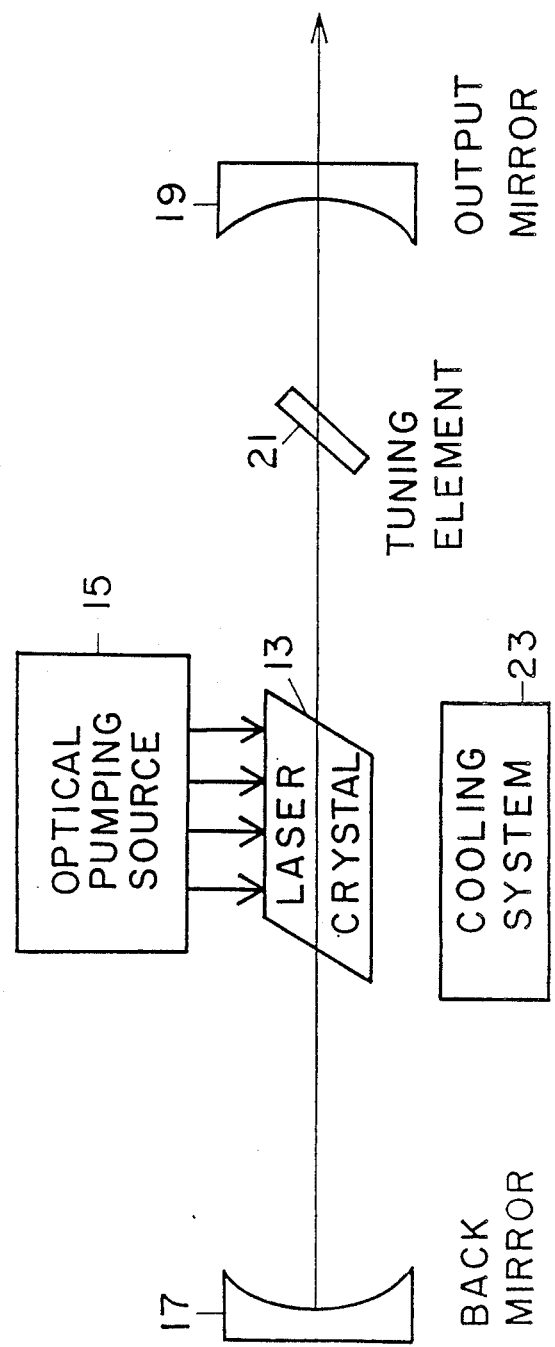
FIG. 2 is a schematic illustration of a tunable laser system according to this invention.

Referring now to FIG. 2, there is illustrated an example of a laser system constructed using a laser medium according to the teachings of the present invention and identified generally by reference numeral 11. Laser system 11 includes a laser medium 13, an optical pumping source 15, an optical resonant cavity made up of a 99.9% (i.e. fully) reflective curved end mirror 17 and a 50 to 99% reflective (partly transmissive) curved end mirror 19, a tuning element 21 located between laser medium 13 and end mirror 19 and a cooling system 23 for regulating the temperture of the laser rod 13, the cooling system 23 being illustrated for simplicity in block diagram form. Laser medium 13 consists of a single crystal of a chromium doped dielectric material as described above with the chromium doping being in the range of about 0.01 to 0.5 atom percent. The crystal is constructed in the form of an elongated rod which is made longitudinal about the c-axis of the crystal. The ends of rod 13 may be cut at a Brewster angle, flat or 6, degree angle and may be coated with a suitable dielectric antireflection coating. Typical dimensions for rod 13 may be 1 cm. by 4 cm. The crystal may be conventionally grown by the Czochralski process. Pumping source 15 may be any suitable optical pumping source, either incoherent or coherent, continuous wave or pulsed, that will excite the laser medium 13. If a coherent pumping source is used it must have an emission wavelength that is absorbed by the ground state of the Cr dopant but not absorbed excessively by the excited state. For example, pumping source 15 may be a xenon lamp or an argon or a diode laser. If pumping source 15 is a laser two configurations are possible, namely, (a) pump beam is perpendicular to the cavity axis (transverse pumping), and (b) pump beam is collinear with the cavity axis (longitudinal pumping). End mirror 17 contains a coating designed for maximum reflectivity over a band width of maximum fluorescence in the 1 to 3 μm region. End mirror 19 is curved and contains a similar coating designed for maximum reflectivity over the same bandwidth as end mirror 17. The 1–3 μm bandwidth covers the range of frequencies over which coherent light is produced using tetravelant chromium as the laser-active ion.

If pumping source 15 is a laser and positioned outside the cavity along the axis of the cavity, the end mirror 10 through which the pumping light passes into the cavity is designed for maximum transmissivity at the pumping laser emission frequency i.e. 532 nm (and/or 1064 nm) if it is a Nd:YAG laser. End mirrors 17 and 19 are spaced apart from one another by the proper distance to form an optically resonant cavity and rod 13 is located along the focal point of the end mirrors. End mirrors 17 and 19 may have a radius of curvature of around 30 centimeters. The output radiation, of laser system 11 shown by arrow 25 emanates from end mirror 19. If desired, both mirrors may be made partially reflecting. Cooling system 23 includes a fluid (not shown) which may be air, water or a cryogenic liquid, contained in a tank in communication with a laser mounting head (not shown) through pipes. Tuning element 21 may be in the form of a prism a grating or a birefringent plate. Laser 11 operates in a conventional manner (as any solid state laser) and emits radiation over frequency band centered in the 1–3 μm spectral region with a bandwidth of 25 nanometers.

Examples of pump source 15 are a Nd:YAg laser (1064 nm), Nd:glass lasers (1054, and 1060 nm), a Cr, Nd:GSGG laser (1061 nm), infrared semiconductor lasers, laser arrays: or any flash lamp or pump source that may excite the absorption band.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A laser comprising:
   a. a laser medium comprising a single crystal of dielectric material doped with chromium ions in the tetravalent state, the single crystal being a crystal of olivine-like structure such as germanates of formula (A) (RE)GeO$_4$ where (A=NA or Li, RE=Y, Lu or Gd), crystals of willemite structure Zn$_2$(Si or Ge)O$_4$ or any other single-crystal or polycrystalline compound containing tetrahedral sites in its crystal lattice, such as Ca$_3$La$_2$(SiO$_4$)$_6$ and YAG,
   b. optical means for exciting said laser medium with wavelengths in the absorption region of said crystal to emit coherent optical radiation, and
   c. an optical resonant cavity for supporting coherent radiation emitted by the laser medium in the fluorescence region.

2. A laser medium comprising a single crystal of dielectric material doped with chromium ions in the tetravalent state (Cr$^{4+}$), the single crystal being a crystal of olivine-like structure such as germanates of formula (A) (RE) GeO$_4$ where (A=NA or Li, RE=Y, Lu or Gd), crystals of willemite structure Zn(Si or Ge)O$_4$ or any other single-crystal or polycrystalline compound containing tetrahedral sites in its crystal lattice, such as YAG and Ca$_3$La$_2$(SiO$_4$)$_6$.

* * * * *